United States Patent [19]

Sutter

[11] 4,050,000
[45] Sept. 20, 1977

[54] MOTOR-DRIVEN CONTROL DEVICE FOR A VALVE-ACTUATING SPINDLE

[75] Inventor: Jean Georges Sutter, Villers-les-Nancy, France

[73] Assignee: Pont-A-Mousson S.A., Nancy, France

[21] Appl. No.: 675,088

[22] Filed: Apr. 8, 1976

Related U.S. Application Data

[63] Continuation of Ser. No. 470,097, May 15, 1974.

[30] Foreign Application Priority Data

June 1, 1973    France .................................. 73.20072

[51] Int. Cl.² ............................................. G05D 3/00
[52] U.S. Cl. .................................. 318/468; 200/61.39
[58] Field of Search ............... 318/467, 468, 469, 475; 200/195 R, 5 R, 179, 61.39, 153 N, 153 V, 330

[56] References Cited

U.S. PATENT DOCUMENTS

| | | | |
|---|---|---|---|
| 2,687,047 | 8/1954 | O'Connor | 200/153 N |
| 3,219,902 | 11/1965 | Sibley | 318/475 |
| 3,308,406 | 3/1967 | Barnhart | 200/61.39 |

Primary Examiner—Robert K. Schaefer
Assistant Examiner—John J. Feldhaus
Attorney, Agent, or Firm—Sughrue, Rothwell, Mion, Zinn and Macpeak

[57] ABSTRACT

The control device comprises an electric motor whose rotor drives a rotary spindle which shifts the closure member of a valve. Means are provided for detecting the stoppage of the rotation of the spindle. Switching means for opening the supply circuit of the motor are responsive to the detecting means so as to stop the supply when the spindle stops rotating.

10 Claims, 9 Drawing Figures

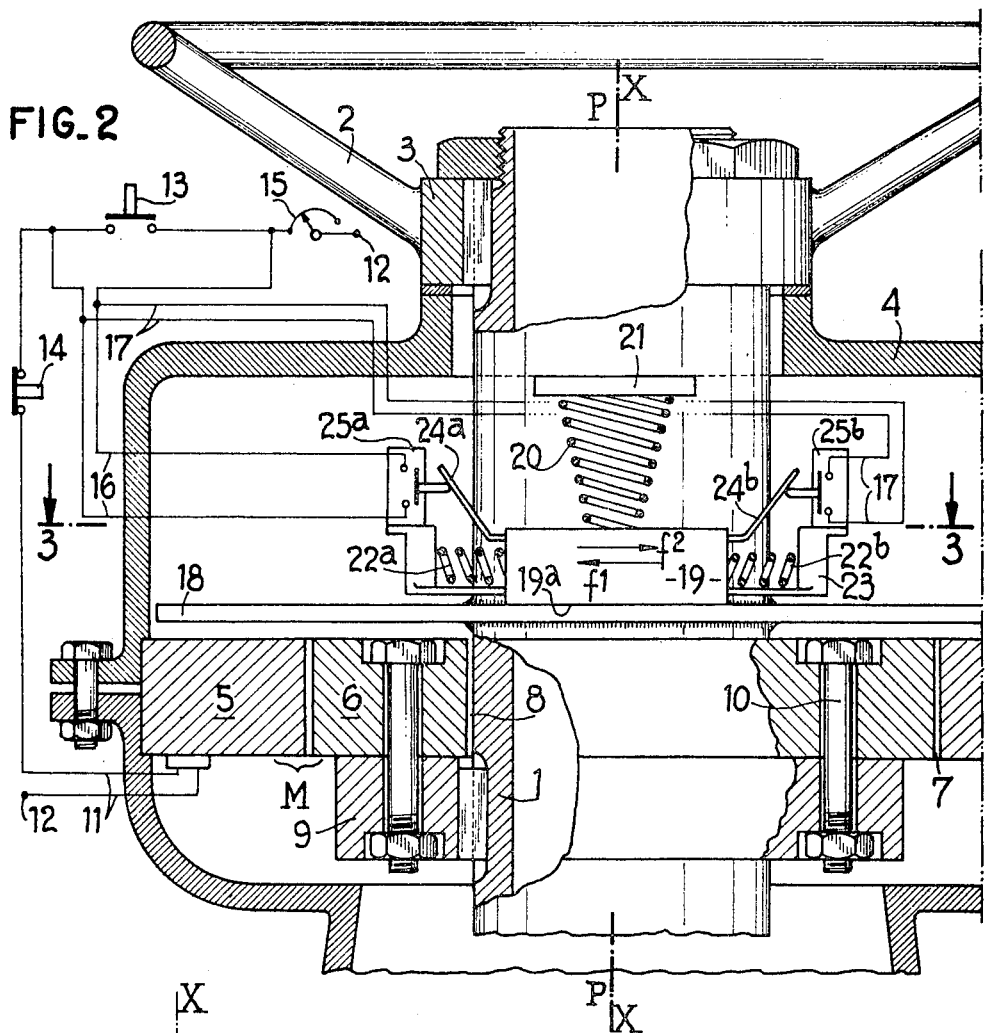
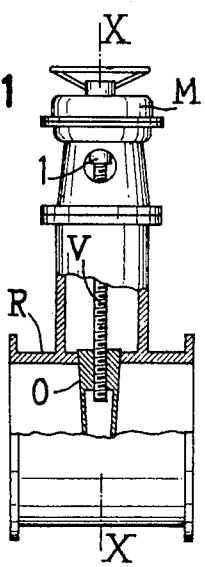
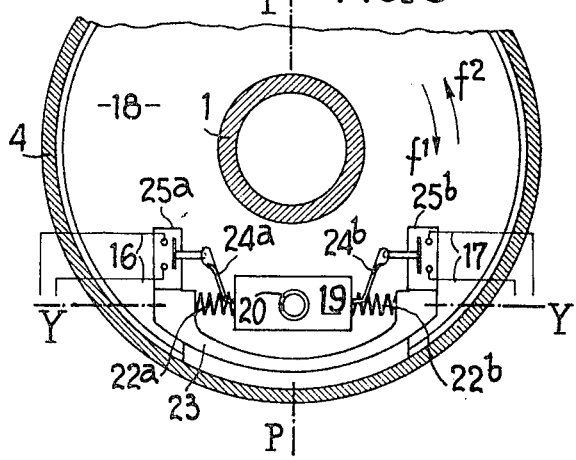

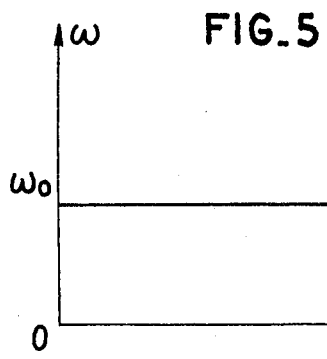
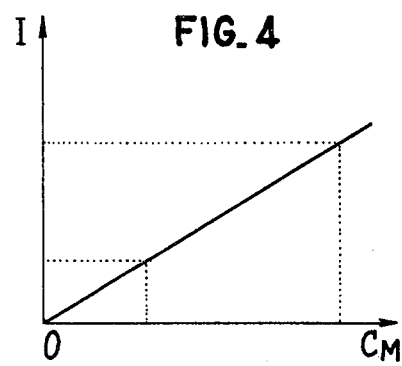
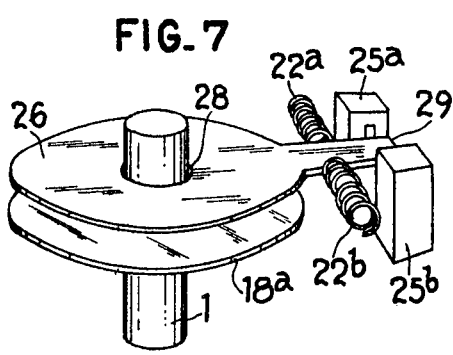
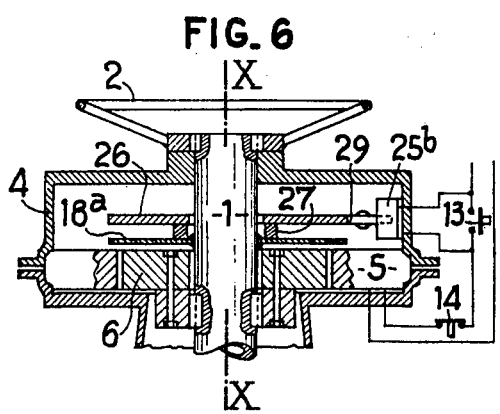
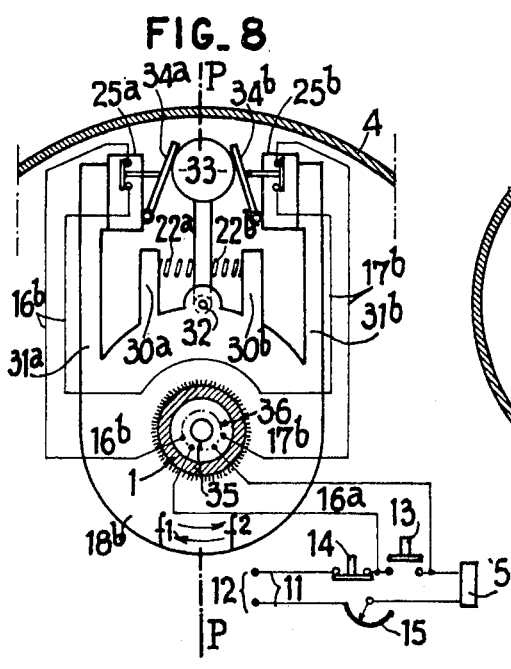
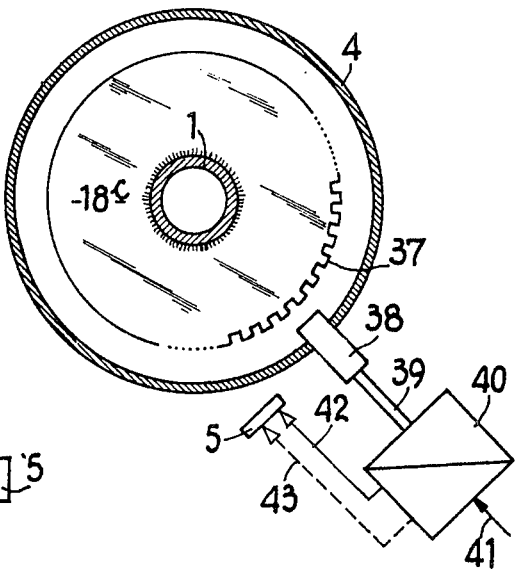

MOTOR-DRIVEN CONTROL DEVICE FOR A VALVE-ACTUATING SPINDLE

This is a continuation of application Ser. No. 470,097, filed May 15, 1974.

The present invention relates to motor-driven control devices for a valve-actuating spindle.

The object of the invention is to achieve in such a device a cutting off of the supply to the motor as soon as the resisting torque at the end of the travel of the closure member exceeds the driving torque.

According to the invention, there is provided a control device comprising an electric motor whose rotor drives in rotation the valve-actuating spindle, wherein means are provided for detecting the stoppage of the rotation of the spindle and switching means for opening the supply circuit of the motor actuated by said detecting means.

In a particularly advantageous embodiment of the invention, the electric motor is a synchronous motor such as a motor having a variable reluctance. Such a motor has indeed the following advantages: its driving torque is proportional to the mean intensity of the electric supply current and its speed of rotation is constant so long as the driving torque is less than the resisting torque, but as soon as the resisting torque becomes equal to the driving torque said motor is suddenly stopped.

Further features and advantages of the invention will be described from the ensuing description with reference to the accompanying drawings.

In the drawings:

FIG. 1 is a diagrammatic view, to a small scale and partly in section, of a gate-valve equipped with a control device according to the invention;

FIG. 2 is a diametral sectional view of said control device to an enlarged scale;

FIG. 3 is a plan view of the control device taken on line 3—3 of FIG. 2 but to a smaller scale;

FIG. 4 is a diagram showing variation in the intensity of the supply current of the motor as a function of the driving torque;

FIG. 5 is a diagram showing variation of the speed of the rotation of the motor as a function of the resisting torque;

FIG. 6 is a diagrammatic sectional view, similar to FIG. 2 but to a smaller scale, of a modification of the control device according to the invention;

FIG. 7 is a diagrammatic partial perspective view of the device shown in FIG. 6, and FIGS. 8 and 9 are diagrammatic views similar to FIG. 3 of two other modifications of the control device according to the invention.

The gate-valve shown in FIG. 1 comprises a closure member or gate which is shifted by an actuating screw V disposed at the end of an actuating spindle 1 having an axis X—X, this spindle being driven by a motor M having a variable reluctance.

There will be given hereinafter several ambodiments of the control device of the invention, some (FIGS. 2, 3, 6, 7 and 8) being of the mechanical or inertia type and the last (FIG. 9) of the electronic type having a direct detection of the rotation and stoppage of the valve-actuating spindle.

As shown in FIGS. 2 and 3, the actuating spindle 1, which has an axis X—X and may be hollow or solid, is provided at its end opposed to the closure member 0 with an actuating hand-wheel 2 whose hub 3 is keyed on the spindle. The latter is place inside a housing 4 which contains a control device of which the variable-reluctance motor M is a part.

This motor M comprises a stator 5 in the form of a ring having an axis X—X fixed in the housing 4, and a coaxial rotor 6 which defines with the stator a very small airgap 7. The ring-shaped rotor 6 defines with the actuating spindle 1 an annular space 8. For the purpose of driving the spindle 1, the rotor 6 is connected to rotate with a driving ring 9 keyed on the spindle 1 the connection being achieved for example by bolts 10.

The control device further comprises, combined with each other and with the motor M, electrical means for pre-regulating the driving torque, constituted by an electric supply circuit for the motor M and means for detecting when the driving torque is exceeded by the resisting torque and constituted by a friction system.

The electric supply circuit of the motor M comprises two conductor wires 11 connecting the stator 5 to a source of current 12. Connected in series in one of the wires 11 are: a manual push-button switch 13 which is normally open and serves to start up the motor, a manual push-button switch 14 which is normally closed and serves to stop the motor, and an adjustable resistor or potentiometer 15 serving to preregulate the mean intensity of the supply current. Two circuits 16 and 17 for detecting the stoppage of the actuating spindle are connected to this supply circuit 11 in parallel with the starting switch 13.

The detecting means comprise a signalling disc 18 having an axis X—X and connected to rotate with the spindle 1, it being for example welded to the latter in the vicinity of the motor M. Disposed on the surface of the disc 18 opposed to the motor M and on the side of the spindle 1 is a signalling block 19 which is of a frictional material, for example stratified plastics material of the phenol formaldehyde type such as that known under the trade name "Celoron" or a like plastics material or wood. This block 19 has at least one planar surface $19^a$ in contact with the disc 18 and has for example a rectangular-sided shape. It is maintained in contact with the surface of the disc 18 by a frustoconical coil spring 20 whose axis is parallel to the axis X—X and bears by its large base on an upper support plate 21 fixed to the housing 4 and by its small base on the face of the block 19 opposed to the surface of the latter in contact with the disc 18. The dimensions of the surface $19^a$ of the block 19 in contact with the disc 18 are substantially less than the radius of the disc 18 and this block is maintained in equilibrium with its plane of symmetry disposed in a plane P-P containing the axis X—X, by means of two opposing springs $22^a$ which are aligned on an axis Y—Y perpendicular to the plane P-P and compressed between the two opposed surfaces $19^b$ of the block 19 which are perpendicular to said axis Y-Y and two branches of a yoke 23 secured to the housing 4, the plane of symmetry of the yoke coinciding with the plane P—P.

The block 19 carries on its two surface $19^b$ two flexible contacts $24^a$ and $24^b$ constituted by flexible rods or strips each of which is adapted to cooperate with a normally-open switch $25^a$ or $25^b$ which detects the position of the block 19. These switches are respectively inserted in detecting circuits 16 and 17 and are closed when the block 19, and therefore one of the rods $24^a$ and $24^b$, approaches the corresponding switch, the corresponding spring $22^a$ or $22^b$ being then compressed, and they are opened when this block or this rod moves away therefrom, the corresponding spring being extended. When one of the switches 25$^a$ and 25$^b$ is closed, the motor M remains supplied with electric current. When both switches are open, which corresponds to the median position of equilibrium of the block 19 on the disc 18, the motor is no longer supplied with current.

The gate-valve and the control device just described operate in the following manner:

When the valve is controlled electrically and when stationary, the stop push-button 14 is not actuated and therefore in the position for closing the circuit and the start push-button 13 is not actuated and therefore in a position for opening the circuit. The motor M is therefore not supplied with current. The friction block 19, urged in the direction of the disc 18 by the spring 20, is in equilibrium with its plane of symmetry disposed in the plane P—P as shown in FIGS. 2 and 3, under the effect of the equal pressure of the opposing springs 22$^a$, 22$^b$. The detecting switches 25$^a$ and 25$^b$ are therefore both open.

In order to start up the electric control of the valve, the start switch push-button 13 is depressed. The electric current then passes into the stator 5. The motor M starts up and its maximum driving torque is adjusted by means of the potentiometer 15. It rotates slowly and drives the actuating spindle 1, and the disc 18, which is carried by the spindle, also rotates, for example in the direction of arrow f$^1$. Owing to the effect of friction, it tends to rotate the friction block 19. The latter therefore moves away from the plane P—P and further compresses the spring 22$^a$ disposed on the upstream side of the block 19 with respect of the direction of rotation. Simultaneously, its rod 24$^a$ closes the switch 25$^a$ and thus causes the current to pass into the circuit 16.

The start switch push-button 30 can then be release, the rotation of the motor and consequently of the spindle 1 and the disc 18 continuing owing to the passage of the current into the circuit 16.

The new position of equilibrium of the block 19, which is offset with respect to the plane P—P, is maintained so long as the rotor continues to rotate in the direction of arrow f$^1$. Depending on whether the torque is increased or decreased by the adjustment of the potentiometer 16, the plane of symmetry of the block 19 is more or less offset with respect to the plane P—P and the spring 22$^a$ is more or less compressed.

The diagram in FIG. 4, in which the driving torque C$_M$ is plotted as abscissae and the means intensity I of the electric control current is plotted as ordinates, shows the proportionality between this torque and this intensity.

At the end of the travel of the closure member A, when a resisting torque C$_R$ arises which exceeds the driving torque C$_M$, the rotor 6 is suddenly stopped. The diagram in FIG. 5, in which the resisting torque C$_R$ is plotted as abscissae and the speed of rotation Ω is plotted as ordinates, shows that so long as the resisting torque remains equal to the driving torque C$_M$ defined by the adjustment of the potentiometer 16, the speed of rotation maintains a constant value Ω$_O$ but that the rotation suddenly stops as soon as the resisting torque becomes greater than the driving torque C$_M$, that is, as soon as the closure member abuts its seat.

Consequently, the disc 18 suddenly ceases to rotate and the block 19, under the action of the spring 22$^a$ which extends and the vibrations of the locked motor, resumes its initial position of equilibrium which is symmetrical relative to the plane P—P. The rod 24$^a$ ceases to actuate the switch 25$^a$ and as the two switches 25$^a$ and 25$^b$ are then open, the supply of current to the motor M is cut off.

If the rotor 6 is driven in rotation in the opposite direction, that is, in the direction of arrow f$^2$, the block 19 moves in the opposite direction and compresses the spring 22$^a$ and closes the switch 25$^b$ through its rod 24$^b$. The operation is the same in other respects.

Thus it can be seen that practically as soon as a resistance corresponding to the pre-adjusted value set by the potentiometer 16 occurs during the displacement of the closure member O and of the spindle 1, the rotor 6 stops and that this stoppage, and therefore this resistance, is immediately detected and the electric supply of the motor is immediately cut off.

Thus this control device permits pre-adjusting the driving torque and detecting the rise in the resisting torque to a value higher than this driving torque for immediately stopping the travel of the closure member O.

In the modification shown in FIGS. 6 and 7, a disc 18$^a$ again connected to the spindle 1 to rotate with the latter but the disc is magnetized. Disposed around the spindle 1 and above the magnetized disc 18$^a$, with interposition of a spacer block 27 secured to the disc 18$^a$, is a second metal disc 26 which replaces the block 19. The disc 26 has a circular centre opening 28 whose diameter is greater than that of the spindle 1 so as to enable the disc to rotate freely with respect to this spindle. This signalling disc 26 carries a radial signalling tab 29 which projects from its periphery and performs the same function as the rods 24$^a$, 24$^b$ of the embodiment shown in FIGS. 2 and 3. This tab 29 is subjected to the action of two opposing springs 22$^a$ and 22$^b$, similar to those shown in FIGS. 2 and 3, and it is capable, by rotating in one direction or the other, of closing one of two switches 25$^a$ and 25$^b$ which are similar to those shown in FIGS. 2 and 3 and fixed to the housing 4.

The interaction between the disc 26 and the disc 18 remains free as in the preceding embodiment but instead of being a frictional action it is a magnetic action.

At rest, the disc 26 bears on the block 27 and is in magnetic connection with the disc 18, the tab 29 being in equilibrium in a median position so that the two switches 29$^a$ and 29$^b$ are open. When the motor rotates in one direction or the other, the disc 18 tends, by magnetic attraction, to rotate the disc 26 and the tab 29 moves in compressing one or the other of the springs 22$^a$ and 22$^b$, depending on the direction of rotation, and therefore closing the corresponding switch 25$^a$ or 25$^b$. As in the preceding embodiments, when the resisting torque exceeds the driving torque, the rotor 6 and the disc 18 suddenly stop rotating. The tab 29 of the disc 26 then rapidly resumes its position of equilibrium between the springs 22$^a$ and 22$^b$ and thus opens the switch 25$^a$ or 25$^b$ which had been previously closed. The supply of the motor is then immediately cut off.

By way of a modification, the disc 18 may be eliminated and there is then a direct magnetic connection between the disc 26 and the stator 5 under the effect of the rotating field of the latter.

In the embodiment shown in FIG. 8, while employing as in the foregoing embodiments the phenomenon of a sudden stoppage of the motor when the resisting torque exceeds the driving torque, this embodiment replaces the frictional or magnetic connection by a connection which employs inertia. Moreover, instead of the detecting means being mounted in fixed relation they are mounted on the disc and rotate at the same speed as the actuating spindle 1. There is provided a rotary plate 18$^b$ welded to the spindle 1 to rotate with the latter. This plate has in projecting relation on its periphery two lugs 30$^a$ and 30$^b$ and two arms 31$^a$ and 3$^b$ for supporting two normally-closed switches 25$^a$ and 25$^b$, said arms being disposed on each side of the lugs 30$^a$ and 30$^b$ and longer than the latter.

Between said lugs and at equal distance from each one thereof, there is pivoted at 32 to the plate 18$^b$ a rod which carries at its end a spherical weight 33 which is pivotable in the plane of the plate 18$^b$ in opposition to the action of two opposing springs 22$^a$ and 22$^b$. The latter are symmetrically arranged, and applied, at one end, against the rod of the weight 33 and, at the other end, against the lugs30$^a$ and 30$^b$. The mass 33 is adapted to cooperate with levers 34$^a$ and 34$^b$ disposed on the switches 25$^a$ and 25$^b$ in such manner as to be capable of closing one or the other under the action of the weight 33. Contrary to the arrangement in the foregoing embodiments, the switches 25$^a$ and 25$^b$ are no longer connected in parallel but in series so as to constitute a single circuit 16$^a$ which is connected to the circuit 11 across the terminals of the start switch 3. The electric control circuit comprises the required branch-connections,, relays and auxiliary contacts which are of known type and have not been shown.

Owing to the rotation of the assembly, whereas the electric supply circuit 11 and the circcuit 6$^a$ are fixed, the connection between the circuit 16$^a$ and the wires 16$^b$ and 17$^b$ connected to the switches 25$^a$ and 25$^b$ is through a slip ring 35 having an axis X—X.

The device just described operates in the following manner:

At rest, the rotary plate 18$^b$ and the weight 33 are in the illustrated position (FIG. 8), the weight 33 being in equilibrium between the springs 22$^a$ and 22$^b$ and the switches 25$^a$ and 25$^b$ being closed. As the push-button start switch 13 is open, the stator 5 is not supplied with current. As soon as the push-button 13 is depressed, the stator 5 is supplied with current and the rotor 6, the spindle 1, the plate 18$^b$ and the whole of the assembly carried thereby rotate. Upon starting up, the weight 33 acts on the contact 25$^a$ and 25$^b$ opposed to the movement (starting up acceleration) and then assumes a position of equilibrium between the opposing springs 22$^a$ and 22$^b$ (synchronous speed) so that the start switch 13 may be released, the switches 25$^a$ and 25$^b$ remaining closed and the current passing through the circuit 16$^a$.

At the end of the travel of the closure member, as soon as the resisting torque exceeds the driving torque, the rotor 6 suddenly stops and the spindle 1 and the plate 18$^b$ also stop. Under the effect of inertia, the weight 33 tends to continue its rotation and, depending on whether this rotation is in the direction of arrow f$^1$ or f$^2$, it continues this rottion in the same direction and actuates one of the two switches 25$^a$ and 25$^b$ through the corresponding lever 34$^a$ or 34$^b$ and compresses the corresponding spring 22$^a$ or 22$^b$. With the switch 25$^a$ or 25$^b$ thus opened, the supply current of the motor is cut off.

The embodiment shown in FIG. 9 also permits detecting when the resisting torque exceeds the driving torque but, instead of employing an inertia device, it employs a pulse-actuated electronic device which detects and directly signals the rotation or the stoppage of a disc connected to rotate with the actuating spindle. A signalling disc 18$^c$ is welded to the spindle 1 and therefore rotates with the latter. This disc carries on the whole of its periphery signalling teeth 37 and there is fixed in front of these teeth 37 on the housing 4 a movement detector 38 which co-operates with the teeth for detecting their rotation and or their stoppage. This detector 38 is for example constituted by a proximity detector and it is connected by a transmission line 19 to a conventional frequency comparator 40 which serves to compare the frequency measured by the passage of the teeth 37 and a theoretical or reference frequency input at 41. Leading from the comparator 40 is a line 42 controlling the supply of the stator 5 and a line 43 controlling the cutting off of this supply, these lines being connected in parallel with the start switch 13 of the supply circuit 11 but in series with the potentiometer 16.

The device just described operates in the following manner:

When the rotor 6, the spindle 1 and the disc 18$^c$ rotate at the speed set by the potentiometer 16, the detector 38 transmits the frequency of rotation of the teeth 37 to the comprator 40 through the line 39. This comparator 40 then produces a signal of coincidence with the reference frequency 41 and this coincidence signal is transmitted to the line 42 to control the supply of the motor M. When the resisting torque exceeds the driving torque the rotor 6 stops, the spindle 1 and the disc 18$^c$ also stopping.

The frequency of the pulses furnished by the detector 18$^c$ drops to O and the frequency comparator 40 produces a signal of non-coincidence with the reference frequency 41, which cuts off the supply. The signalling teeth 37 may of course be replaced by optical references and the electronic detector 38 by an optical detector.

In the case where a conventional synchronous motor is employed instead of the variable-reluctance motor described hereinbefore, a speed reducer should be interposed between the rotor of this conventional synchronous motor and the valve-actuating spindle. In this case, the aforementioned means for detecting the stoppage of the rotation of the spindle and for cutting off the supply of the motor are mounted between the actuating spindle 1 and the output shaft of the speed reducer.

Having now described my invention what I claim as new and desire to secure by Letters Patent is:

1. In a control device for shifting a closure member of a valve, comprising a case, a spindle rotatably mounted in the case to rotate about an axis for connection to the closure member, an electric motor having a stator and a rotor, means for connecting the rotor to the spindle to rotate the spindle, an electric power supply circuit electrically connected to the motor, means for detecting stoppage of the rotation of the spindle, switching means inserted in said circuit and responsive to the detecting means for opening the supply circuit when the spindle stops rotating, the detecting means comprising a detecting element mounted to be movable with respect to said case transversely of a radial plane containing said axis in a given direction between a first position and a second position, the detecting element being cooperative with the switching means to achieve opening of the supply circuit in said first position and closure of the supply circuit in said second position, and force transmitting means interposed between the spindle and the detecting element for urging the detecting element to said second position while the spindle is being driven in rotation by the motor; the improvement comprising in combintion abutment means fixed relative to said case, elastically yieldable means interposed between said abutment means and said detecting element for elastically biasing the detecting element to said first position, said electric motor being a variable reluctance motor and said means connecting the rotor to the spindle being operative to prevent rotation of the rotor when the spindle is prevented from rotating, said force transmitting means being capable of exerting sufficient force on the detecting element to overcome the action of the elastically yieldable means and shift the detecting element to said second position when the spindle is rotated to actuate the valve in a given direction and capable of allowing the detecting element to return to said first position under the combined actions of the elastically yieldable means and the vibrations of the electric motor when the spindle is prevented from rotating and current is continued to be supplied to the electric motor.

2. A device as claimed in claim 1, wherein the rotor is fixed to the spindle to rotate with the spindle.

3. A device as claimed in claim 1, wherein the detecting element is mounted to be movable in a second direction opposed to said given direction away from said first position to a third position, said force transmitting means being capable of exerting sufficient force on the detecting element to overcome the action of the elastically yieldable means and shift the detecting element to said third position when the spindle is rotated to actuate the valve in a direction opposed to said given direction of valve actuation and capable of allowing the element to return to said first position under the action of the elastically yieldable means and said vibrations of the electric motor when the spindle is prevented from rotating, said switching means comprising two switches disposed on opposite sides of said element so that one of the switches is operated upon movement of the element to said second position and the other switch is actuated upon movement of the element to said third position.

4. A device as claimed in claim 1, wherein the transmitting means comprise frictional drive means between the element and the spindle.

5. A device as claimed in claim 1, wherein the transmitting means comprise magnetic drive means between the element and the spindle.

6. A device as claimed in claim 1, wherein the second means comprise weight carried by the element and the element is pivotally mounted relative to the spindle whereby the element is shifted to said first position under the effect of inertia when the spindle stops rotating.

7. A device as claimed in claim 1, wherein said switching means are fixed relative to the case.

8. A device is claimed in claim 1, wherein the elastically yieldabe means are supported by the spindle and are co-operative with said element for yieldingly maintaining said element in said second position with respect to the spindle, said switching means having a part which is acted upon by the detecting element and is mounted on said spindle.

9. A valve having a case, a closure member within the case and a spindle rotatable relative to the case about an axis for shifting the closure member between valve opening and valve closing positions, a control device for rotating the spindle and comprising an electric motor having a stator and a rotor, means for connecting the rotor to the spindle to rotate the spindle, an electric power supply circuit electrically connected to the motor, means for detecting stoppage of the rotation of the spindle, switching means inserted in said circuit and responsive to the detecting means for opening the supply circuit when the spindle stops rotating, the detecting means comprising a detecting element mounted to be movable with respect to said case transversely of a radial plane containing said axis in a given direction between a first position and a second position, the detecting element being cooperative with the switching means to achieve opening of the supply circuit in said first position and closure of the supply circuit in said second position, and force transmitting means interposed between the spindle and the detecting element for urging the detecting element to said second position while the spindle is being driven in rotation by the motor, abutment means fixed relative to said case, elastically yieldable means interposed between said abutment means and said detecting element for elastically biasing the detecting element to said first position, the electric motor being a variable inductance motor and said means connecting the rotor to the spindle being operative to prevent rotation of the rotor when the spindle is prevented from rotating, said force transmitting means being capable of exerting sufficient force on the detecting element to overcome the action of the elastically yieldable means and shift the detecting element to said second position when the spindle is rotated to actuate the valve in a given direction and capable of allowing the detecting element to return to said first position under the combined actions of the elastically yieldable means and the vibrations of the electric motor when the spindle is prevented from rotating the current is continued to be supplied to the electric motor.

10. In a control device for shifting a closure member of a valve, comprising a case, a spindle rotatably mounted in the case to rotate about an axis for connection to the closure member, an electric motor having a stator and a rotor, means for connecting the rotor to the spindle to rotate the spindle, an electric power supply circuit electrically connected to the motor, means for detecting stoppage of the rotation of the spindle, switching means inserted in said circuit and responsive to the detecting means for opening the supply circuit when the spindle stops rotating, the detecting means comprising a detecting element mounted to be movable with respect to said case transversely of a radial plane containing said axis in a given direction between a first position and a second position, the detecting element being cooperative with the switching means to achieve opening of the supply circuit in said first position and closure of the supply circuit in said second position, and force transmitting means interposed between the spindle and the detecting element for urging the detecting element to said second position while the spindle is being driven in rotation by the motor; the improvement comprising in combination abutment means fixed relative to said case, elastically yieldable means interposed between said abutment means and said detecting element for elastically biasing the detecting element to said first position, said electric motor being a variable reluctance motor and said means connecting the rotor to the spindle being means fixing the spindle to the rotor to rotate with the rotor, said force transmitting means being a friction drive means capable of exerting sufficient force on the detecting element to overcome the action of the elastically yieldable means and shift the detecting element to said second position when the spindle is rotated to actuate the valve in a given direction and capable of allowing the detecting element to return to said first position under the combined actions of the elastically yieldable means and the vibrations of the electric motor when the spindle is prevented from rotating and current is continued to be supplied to the electric motor.

* * * * *